United States Patent
Lorrain et al.

(10) Patent No.: US 9,307,181 B1
(45) Date of Patent: Apr. 5, 2016

(54) TIME-BASED TRIGGERING OF RELATED CONTENT LINKS

(71) Applicant: Google Inc., Mountain View, CA (US)

(72) Inventors: Matthieu Lorrain, New York, NY (US); Kyle Locke, Moss Beach, CA (US); John Michael Militello, New York, NY (US); Seth Louis Barron, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/242,424

(22) Filed: Apr. 1, 2014

(51) Int. Cl.
*H04N 5/44* (2011.01)
*H04N 21/431* (2011.01)
*H04N 21/462* (2011.01)
*H04N 5/445* (2011.01)

(52) U.S. Cl.
CPC ....... *H04N 5/44591* (2013.01); *H04N 5/44504* (2013.01)

(58) Field of Classification Search
CPC ............. H04N 5/445; H04N 5/44591; H04N 21/4316; H04N 21/4312; H04N 21/4622
See application file for complete search history.

(56) References Cited

U.S. PATENT DOCUMENTS

| | | | |
|---|---|---|---|
| 8,457,468 B2 | 6/2013 | Chen et al. | |
| 2012/0079380 A1* | 3/2012 | Tsai et al. | 715/716 |
| 2012/0236201 A1* | 9/2012 | Larsen et al. | 348/468 |
| 2013/0317951 A1 | 11/2013 | Kuznetsov | |
| 2014/0064693 A1* | 3/2014 | Deshpande et al. | 386/230 |
| 2014/0108544 A1 | 4/2014 | Lewis et al. | |

* cited by examiner

*Primary Examiner* — Jefferey Harold
*Assistant Examiner* — Sean Haiem
(74) *Attorney, Agent, or Firm* — Byrne Poh LLP

(57) ABSTRACT

Video content can be amplified to enhance the experiences of content consumers. In that regard, the presentation of the video content need not be treated as a standalone experience, but rather can be integrated with other rich and related content to provide a more immersive and engaging experience. Video content can be presented in a first portion of the display, and references to related content can be presented in a second portion of the display. The references can be triggered at defined times of the presentation of the video content. The related content can be displayed alongside the video content upon selection of an associated reference or in some cases automatically at the defined time.

18 Claims, 13 Drawing Sheets

TIME-BASED TRIGGERING OF RELATED CONTENT LINKS

TECHNICAL FIELD

This disclosure generally relates to mechanisms for providing links during a presentation of a video that reference content that is related to the video at a predetermined time during the presentation of a video.

BACKGROUND

Today, a significant portion of video presentations are sourced remotely and streamed to a local display. Numerous opportunities exist to enhance the experiences of content creators/curators and content consumers in connection with video content.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to time-based triggering of related content links (e.g., references). A presentation component can be configured to provide a presentation of a video at a first portion of a display. An amplification component can be configured to facilitate at a second portion of the display a presentation of a reference that references related content that is related to the video. A timing component can be configured to instruct the amplification component to activate the reference at the defined time associated with the presentation of the video.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
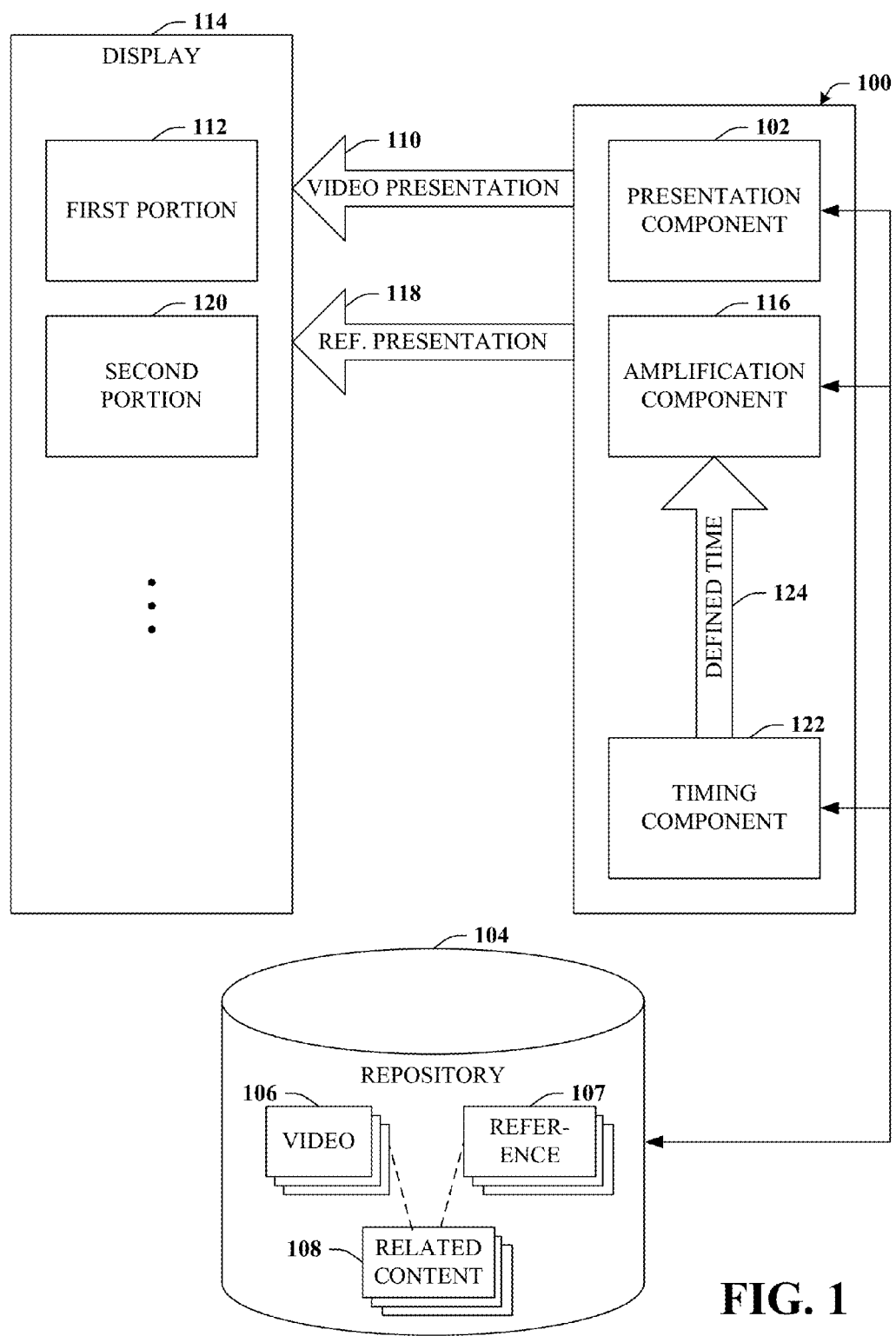
FIG. 1 illustrates a block diagram of an example system that can present amplified content that can provide for presenting links or references to related content at a defined time during a presentation of a video in accordance with certain embodiments of this disclosure.

Video content can be very engaging, but is in some ways one-dimensional and transitory. In this regard, the viewing experience of video presentations can be extended to provide improved engagement and storytelling power and to introduce content creators (or curators) and content consumers to a richer range of content types with which most users are already familiar. The disclosed subject matter can provide a scalable video curation platform and a richer video presentation platform. These platforms can provide "content amplification" and rich topic-based linking in connection with video presentations For example, content amplification can relate to mechanisms to signpost and display other sources of related content (e.g., web content) alongside a video in a separate portion of the display. Signposting can be contextual with respect to the video and triggered at a specific point on the video timeline. It is appreciated that technologies exist that leverage in-frame annotation, however the disclosed subject matter has numerous advantages over previous in-frame annotation. For example, previous in-frame annotations exist within the video presentation area, which can occlude and/or interfere with the presentation. In contrast, the claimed subject matter can provide references in a separate portion of the display. Furthermore, previous in-frame annotations typically do not significantly affect a viewing experience in terms of, e.g., interactivity and immersion with respect to the video content. In contrast, the claimed subject matter can provide for richer related content and potentially user-directed themes or categories for the related content. As another example, previous in-frame annotations typically operate at most on the source video presentation. In contrast, the claimed subject matter can provide links that operate on or affect multiple presentations included in the integrated display.

In some embodiments, advanced content management tools or techniques can be provided. Such can enable content creators or curators to easily and effectively link content through a network of relationships that goes deeper than simple tags, which can enrich the experiences of content consumers and can improve content discovery processes. Such tools and techniques can be supplemented by an ability to map content to sources such as Freebase, to automatically discover further relationships, and to join the platform content to a knowledge graph.

In some embodiments, the disclosed subject matter can be implemented via a browser (e.g., web browser). Responsive interfaces can be provided and such interfaces can be optimized for any form factor, including, e.g., mobile displays or tablet displays.

Example Content Presentation Systems

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can consent to providing data in connection with data gathering aspects. In instances where a user consents to the use of such data, the data may be used in an authorized manner. Moreover, one or more implementations described herein can provide for anonymization of identifiers (e.g., for devices or for data collected, received, or transmitted) as well as transparency and user controls that can include functionality to enable users to modify or delete data relating to the user's use of a product or service.

Referring now to FIG. 1, a system 100 is depicted. System 100 can present amplified content that can, inter alia, provide for presenting links or references to related content at a defined time during a presentation of a video. Embodiments disclosed herein can, for example, extend the viewing experience of video content and can leverage the engagement and storytelling power of video in advantageous ways including introducing content consumers to a richer range of content types that can be integrated and/or unified. System 100 can include a memory that stores computer executable components and a processor that executes computer executable components stored in the memory, examples of which can be found with reference to FIG. 10. It is to be appreciated that the computer 1002 can be used in connection with implementing one or more of the systems or components shown and described in connection with FIG. 1 and other figures disclosed herein. As depicted, system 100 can include a presentation component 102, an amplification component 116, and a timing component 122.

Presentation component 102 can be configured to provide a presentation 110 of a video 106 at a first portion 112 of a display 114. In that regard, presentation component 102 or other components of system 100 can be coupled to repository 104. Repository 104 can include one or more video 106 that is presented (e.g., via video presentation 110), one or more reference 107 elements, and one or more related content 108 elements, which are further detailed herein. By way of brief introduction, however, related content 108 can be related to video 108 and/or video presentation 110. Reference 107 can represent a link, address, location, or call to the related content 108. Elements 106-108 can be included in a single repository 104 or distributed among multiple repositories 104. As used herein, repository 104 is intended to be a store of all or portions of data, data sets, or information described herein or otherwise suitable for use with the described subject matter. repository 104 can be centralized, either remotely or locally cached, or distributed, potentially across multiple devices and/or schemas. Furthermore, repository 104 can be embodied as substantially any type of memory, including but not limited to volatile or non-volatile, sequential access, structured access, or random access, solid state, and so on. It should be understood that all or portions of repository 104 can be included in systems 100 or other suitable components described herein, or can reside in part or entirely remotely.

In some embodiments, video 106 data can reside at a content hosting site or service and can be streamed via a communication network to a user device display (e.g., display 114). Regardless, as previously noted, presentation component 102 can provide video presentation 110 at a particular location of display 114, which is denoted herein as first portion 112 and for which various illustrative examples are provided in connection with FIGS. 3-4C. Display 114 can be a view screen of some type or a graphical user interface. In some embodiments, display 114 can be a user interface associated with a browser, such as a web browser.

Amplification component 116 can be configured to facilitate a reference presentation 118, which can leverage presentation component 102. Reference presentation 118 can be a presentation of a particular reference 107 that references related content 108 that is related to video 106 and/or video presentation 110. Reference presentation 118 can be presented at a second portion 120 of display 114 that differs from first portion 112. In other words, amplification component 116 can present a reference to content in one part of display 114 (e.g., second portion 120) that references related content 108 that is related to a video 106 that is being presented in another part of display 114 (e.g., first portion 112).

Timing component 122 can be configured to instruct amplification component to activate the reference 107 at a defined time 124 associated with the presentation of the video 106. For example, certain related content 108 might only be relevant to video 106 during a brief segment of video presentation 110, e.g., for a thirty-second span that begins two minutes into video presentation 110. In that case, defined time 124 can be 2:00 minutes and can span for thirty seconds. At the defined time 124, reference 107 can be activated, which depending on the embodiment can take many forms. In some embodiments, reference presentation 118 might be displayed at the defined time 124. After the thirty-second period, reference presentation 118 might be removed from display 114. In some embodiments, reference presentation 118 might be previously or continuously presented at second portion 120, but ghosted and/or not selectable then become active and/or selectable at defined time 124. Regardless of the implementation, once reference 107 becomes active, a live link to related content 108 can be provided, various examples of which can be found in connection with FIG. 2.

Figure 2:
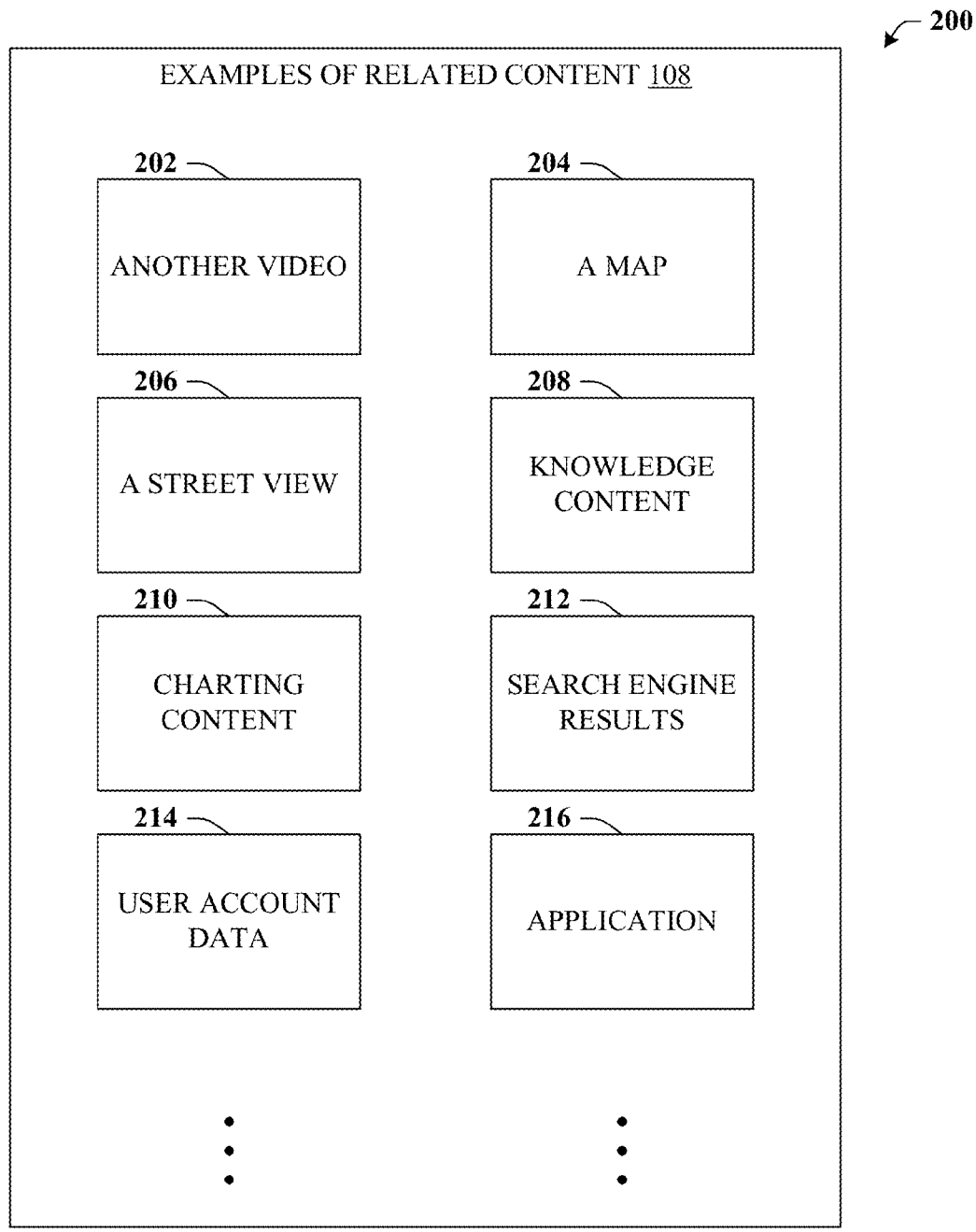
FIG. 2 provides a block diagram illustration that depicts numerous example of related content in accordance with certain embodiments of this disclosure.

Referring now to FIG. 2, illustration 200 is provided. Illustration 200 depicts numerous examples of related content 108. It is understood that related content 108 can be expansive, but a few non-limiting concrete examples are provided for illustrative purposes. For instance, related content 108 can be another video 202, a map 204 (e.g., an orthogonal map, satellite view, etc.), or a street view 206, any of which might be interactive or updateable. As other examples, related content 108 can be various types of content such as knowledge content 208, charting content 210, search engine results 212 or user account data 214.

Knowledge content 208 can relate to information from a knowledge graph, information from a wiki or other data source (e.g., biographies, guides, etc.), product or brand information (specifications, purchasing, etc.), and so forth. Charting content 210 can relate to various relevant charting data, which can include heat maps, bar, pie, or other charts and so forth. User account data 214 can relate to named account identities or content searches to be displayed within, e.g., a channel and associated with specific content. Such might be related to accounts associated with online services such as social networking services, content hosting services, communication services, and so on.

As still another example, related content 108 can be an application 216. In some embodiments, application 216 can be an application programming interface (API). As with items 202-214, content from application 216 can be embedded in display 114 in addition to video presentation 110.

Figure 3:
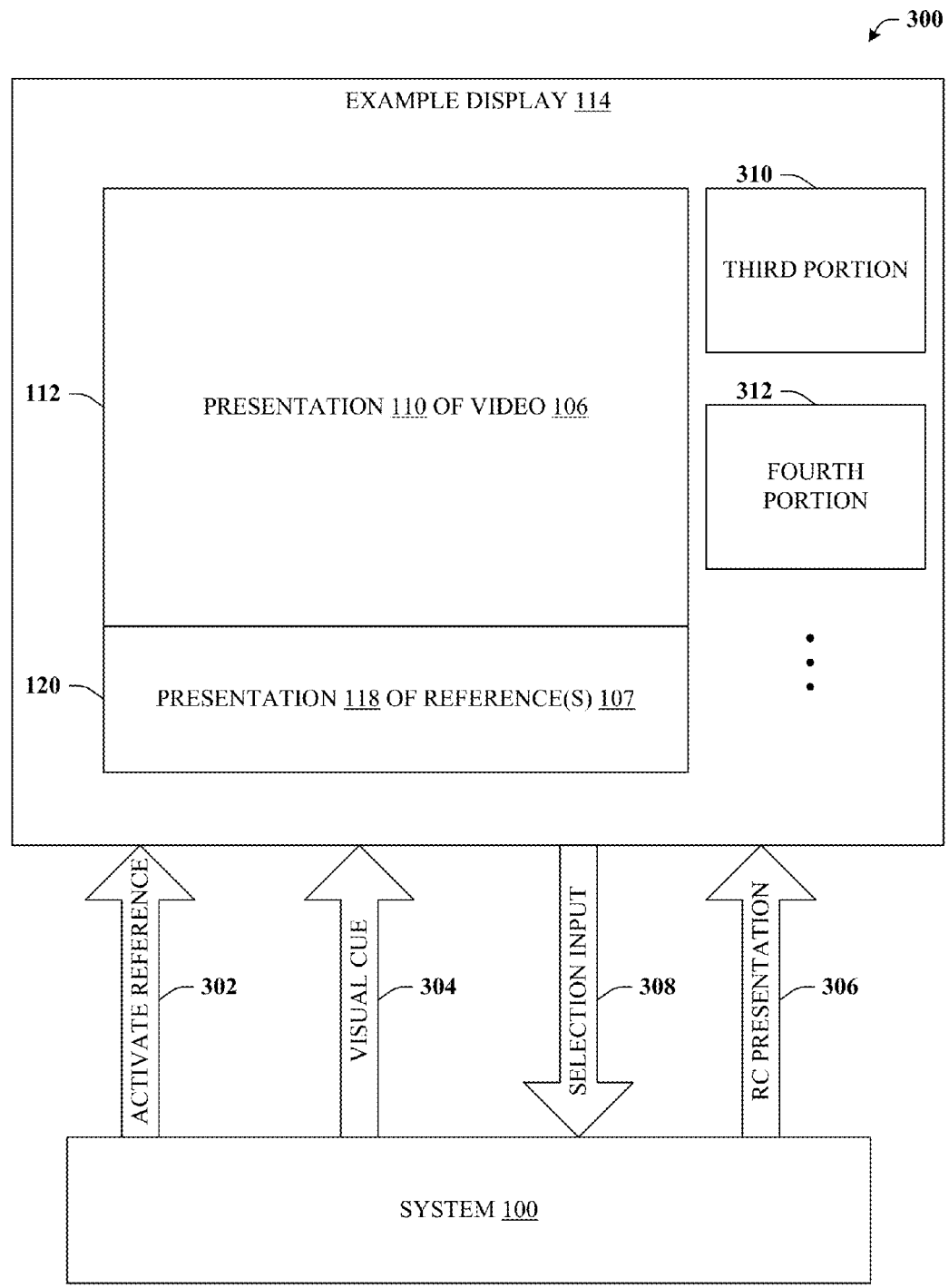
FIG. 3 illustrates a block diagram of a system that depicts an example arrangement for the display in accordance with certain embodiments of this disclosure.

Turning now to FIG. 3, Illustration 300 is provided. Illustration 300 depicts an example arrangement for display 114. In this example, presentation 110 (of video 106) can be situated at the first portion 112 of the display 114. Presentation 118 (of reference(s) 107) can be situated at the second portion 120 of the display 114. Reference presentation 118 can update as video presentation 110 progresses. For example, suppose the beginning of video presentation 110 mentions a particular brand of chocolate, but thereafter there is no further mention of the chocolate. In that case, reference presentation 118 can update such that during the beginning of the video presentation 110 various references 107 to content related to that particular brand of chocolate can be presented, and thereafter those references 107 can be removed. At the appropriate times, timing component 122 of system 100 can instruct amplification component 116 to activate those references 107, which is denoted by reference numeral 302. Such can occur at the defined time 124 associated with video presentation 110, e.g., while video presentation 110 is making mention of the chocolate or otherwise when such a reference 107 is relevant.

In some embodiments, amplification component 116 can facilitate at one or more defined time 124 a visual cue 304. Visual cue 304 can be configured to attract attention to reference presentation 118. For example, a reference 107 that links to video content that details the making of the chocolate can be displayed initially, but that reference 107 can be grayed or ghosted. At defined time 124, the reference 107 can become active, and the associated presentation 118 can be highlighted or flash briefly to provide visual cue 304.

In some embodiments, amplification component 116 can facilitate at one or more defined time 124 a presentation of the related content 108. In this example, the related content 108 is a brief video detailing the making of the chocolate, and such can be automatically presented at third portion 310 of display 114. Generally, third portion 310 differs from first portion 112 (as illustrated) and does not overlap first portion 112. A content consumer might choose to play the related content, for instance, by selecting a play icon within third portion. Other related content 108 might be presented in fourth portion 312, such as sales information relating to the brand of chocolate in the country or other locale of the content consumer.

In some embodiments, amplification component 116 can facilitate a presentation 306 of the related content 108 in response to selection of an associated reference 107 included in reference presentation 118 that is located at second portion 120 of display 114. For instance, a content consumer might select an icon associated with reference 107 via a mouse click, and such selection input 308 can be provided to system 100. Regardless of whether related content presentation 306 is initiated automatically (e.g., at a defined time 124) or in response to selection input 308, additional aspects can be provided.

For example, in some embodiments, related content 108 can be presented in first portion 112 of display 114 and video presentation 110 (that previously occupied first portion 112) can be moved to third portion 310 (or another portion) of display 114. In such cases, video presentation 110 and/or related content presentation 306 can be resized while being moved to the destination portion of display 114. In some embodiments, video presentation 110 can continue uninterrupted during related content presentation 306. In other embodiments, for instance in the case where related content is another video 202, video presentation 110 can be automatically paused.

Figure 4A:
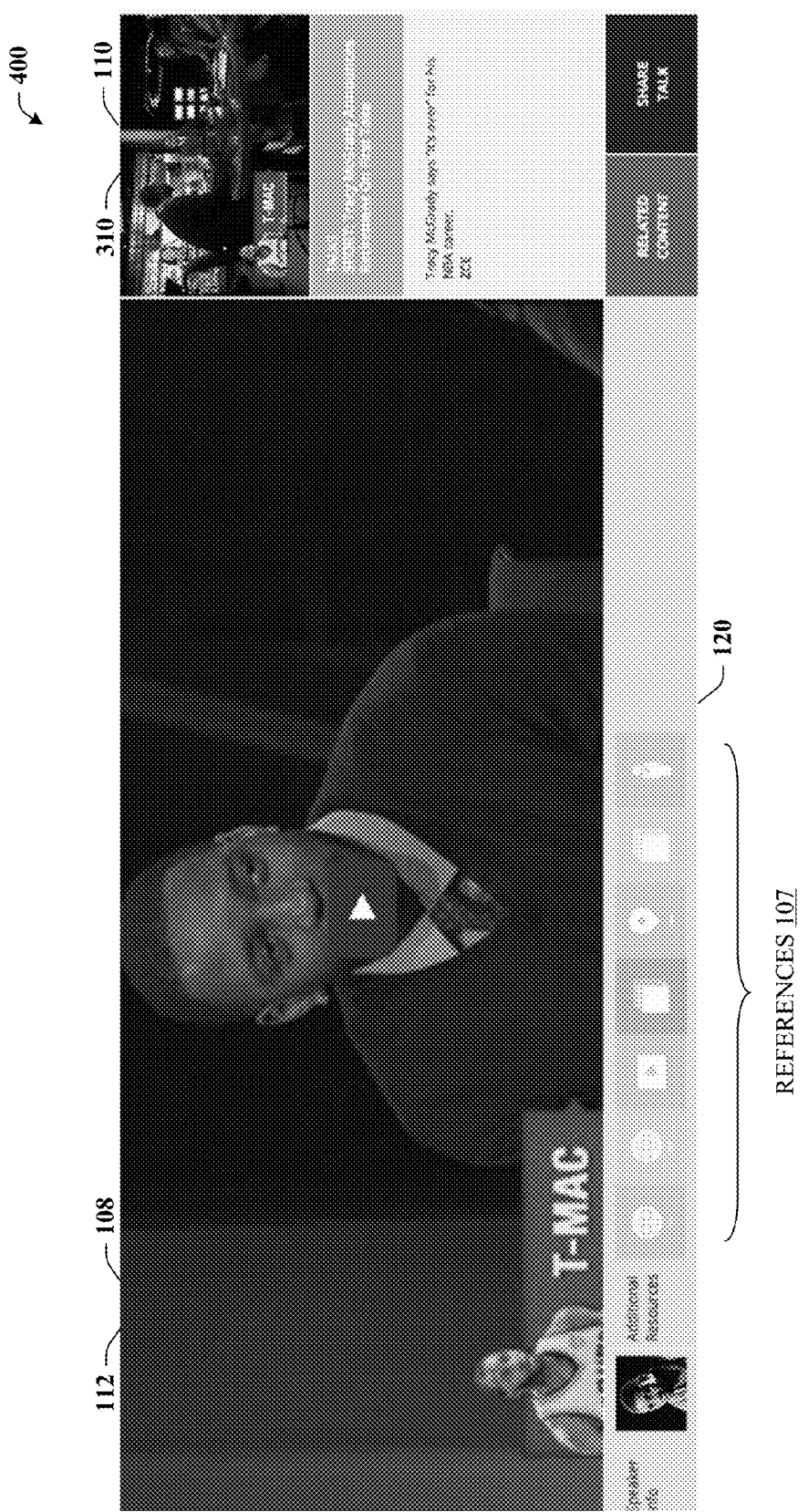
FIGS. 4A-4C illustrate various graphical depictions of several example displays in accordance with certain embodiments of this disclosure.
Figure 4B:
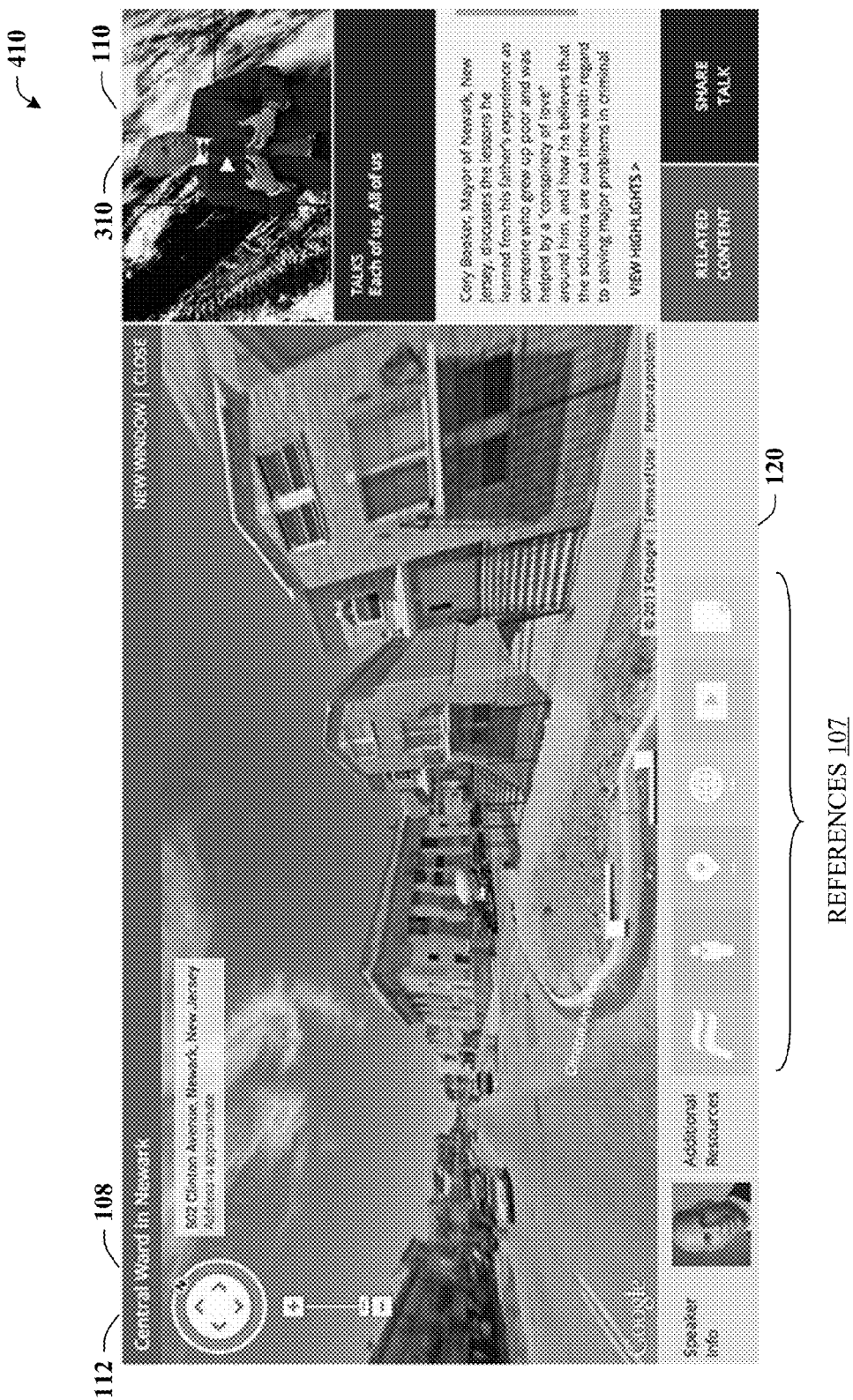
Figure 4C:
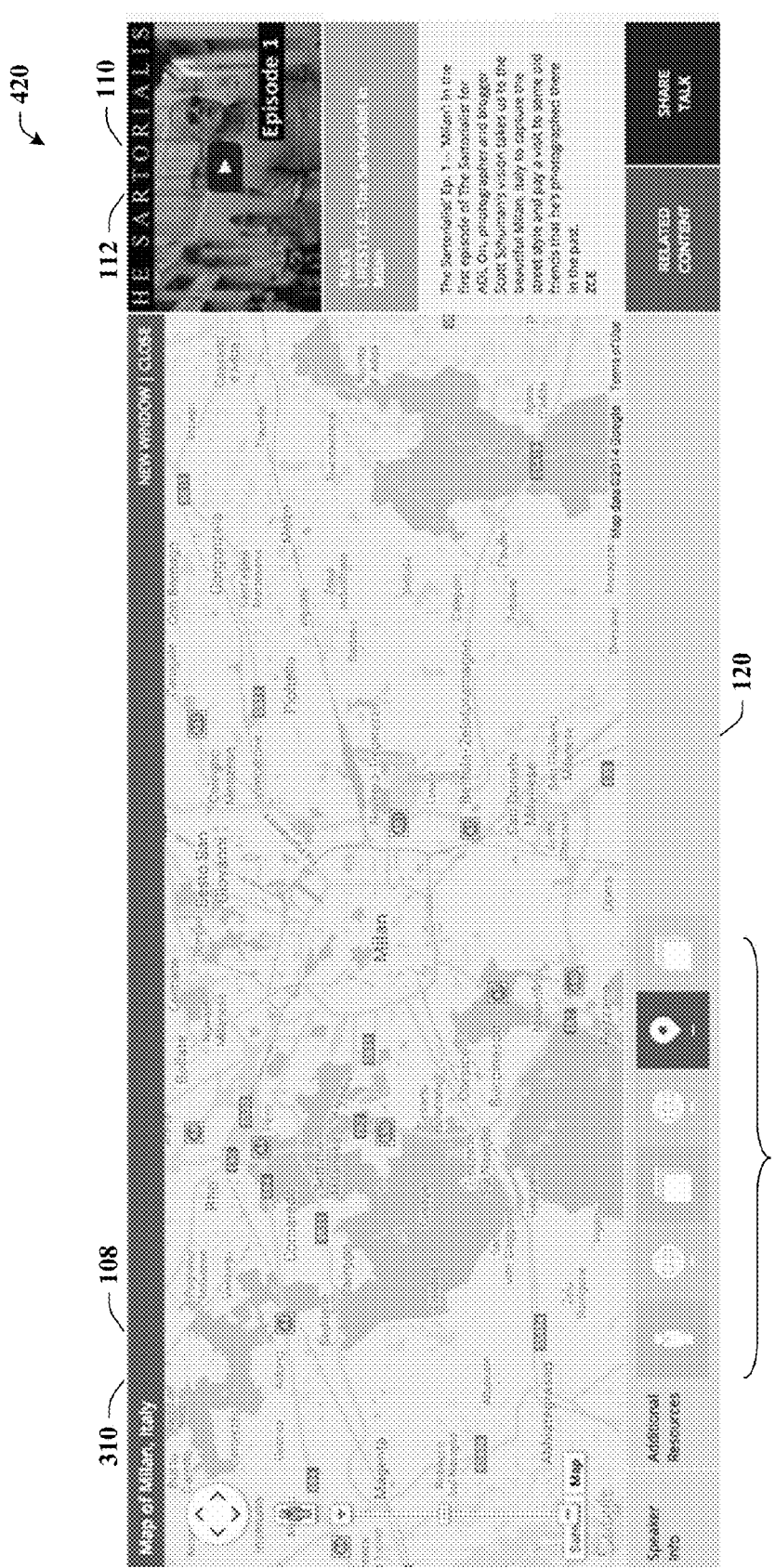

FIGS. 4A-4C illustrate various graphical depictions of an example display 114. Graphical depiction 400 of FIG. 4A includes a first portion 112, second portion 120, and third portion 310. In this example, video presentation 110 relates to a sports news story in which a well-known athlete has announced his retirement. Video presentation 110 is currently located in third portion 310 (in the top-right box). Video presentation 110 might have initially started at this location or might have been moved to that location such as in response to selection of a reference 107. Regardless, related content 108, which in this case is a video with the athlete detailing his reasons for retirement, is now in first portion 112. A content consumer might click the play icon to start the related video, which in some embodiments can automatically pause video presentation 110.

Graphical depiction 410 of FIG. 4B also includes a first portion 112, second portion 120, and third portion 310. In this example, video presentation 110 relates to a city mayor discussing lessons he learned while growing up in a poor neighborhood. While the mayor mentions his boyhood neighborhood, related content 108 can be a streetview of the indicated neighborhood, or even the specific address. Such might be presented automatically (e.g., at a defined time 124) or in response to selection of an associated reference 107.

Graphical depiction 420 of FIG. 4C also includes a first portion 112, second portion 120, and third portion 310. In this example, video presentation 110 relates to a video from a popular fashion blog, wherein the first episode relates to fashion in Milan, Italy. In this case, related content 108 relates to an interactive map of Milan, which can be presented at a relevant time (e.g., defined time 124) or in response to selection input 308.

Figure 5:
FIG. 5 illustrates various example interfaces that illustrate an overall progression of an example experience of a content consumer as well as providing an example of the experience on a mobile, tablet, or smaller form factor devices in accordance with certain embodiments of this disclosure.

Turning now to FIG. 5, various example interfaces are provided. These interfaces 500-504 illustrate an overall progression of an example experience of a content consumer as well as providing an example of the experience on a mobile, tablet, or smaller form factor devices. Interface 500 depicts an example illustration in which a variety of different categories available within the overall content domain are presented. The content consumer might choose to filter the overall content in a range of different ways such as, e.g., by category, video author, topic, and so on.

Upon selection of a particular category depicted by example interface 500, the display can change to that of example interface 502. For instance, one the content consumer has selected the category or area of content of interest, the presentation can then provide the ability to browse a selection of video content with additional content provided. Selecting a video (e.g., at example interface 502) can progress to an immersive layer with amplified content as detailed herein and similar to that detailed in connection with FIGS. 1-4C.

Example interface 504 reflects an example of the immersive layer. Video presentation 110 can be provided as well as reference presentation 118 that presents various references 107. Once viewing a video, the content consumer can be provided with a range of different options for engaging further with the video content, as detailed. For example, amplification content (e.g., provided by references 107) can be arranged alongside the video and can be accessed while the video continues to play. In addition, content items can be actively brought to the attention of the user through timeline-based triggers which can be set up with a set of curation tools further detailed below. Related content (e.g., related content 108) can be presented via a variety of calls to action and can open up many ways in which the content consumer can surf on to the next piece of content, depending on which feature of the video has most effectively engaged the content consumer. It is appreciated that deep linking can be provided as well, which can enable the content consumer to drop straight into this immersive layer through a shared link or shortcut provided from another source such as another area of a video channel.

Example Content Creation/Augmentation Systems

Figure 6:
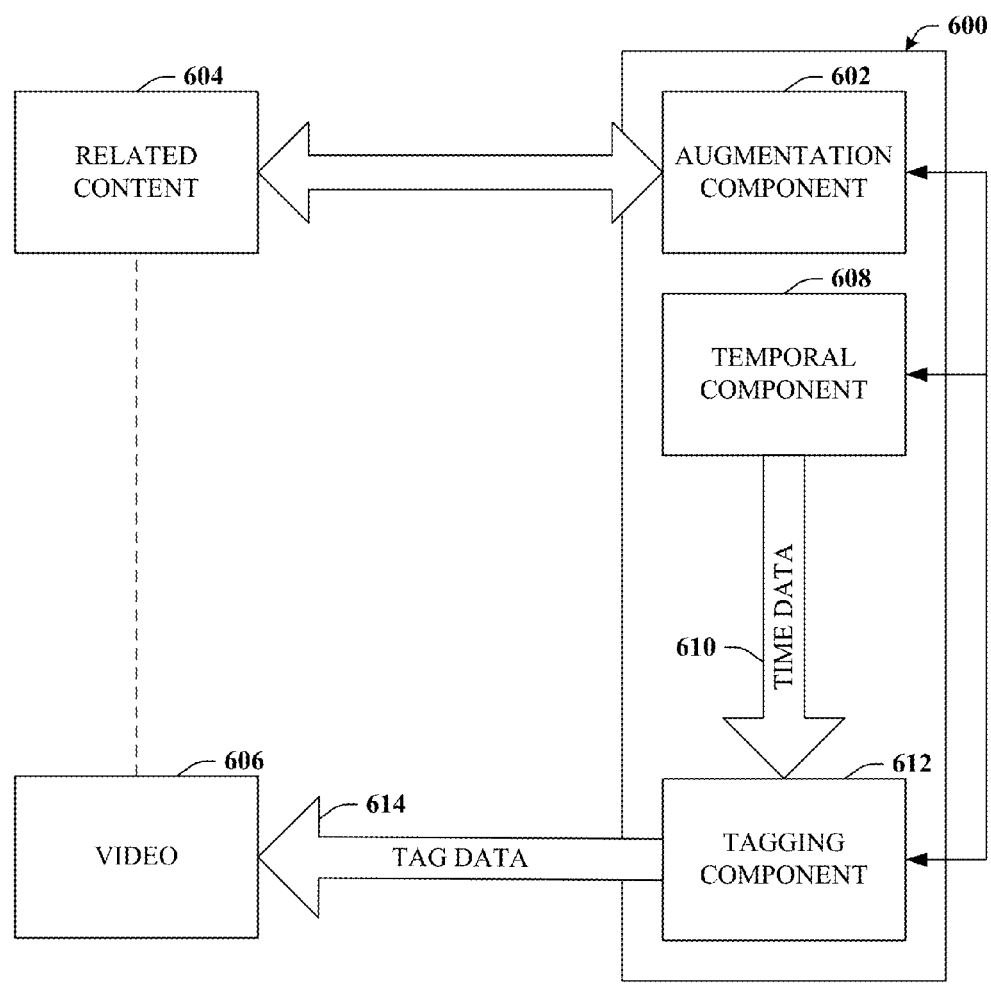
FIG. 6 illustrates a block diagram of a system that can provide for augmenting video content to enable time-based triggers of related content links or references in accordance with certain embodiments of this disclosure.

Referring to FIG. 6, system 600 is provided. System 600 can provide for augmenting video content to enable time-based triggers of related content links or references. For example, system 600 can provide a set of tools such that curators and/or content creators can create the content that is presented according to system 100 detailed above. System 600 can include an augmentation component 602, a temporal component 608, and a tagging component 612.

Augmentation component 602 can be configured to identify related content 604 that is related to a presentation of a video 606. Additional features or aspects of augmentation component 602 can be found with reference to FIG. 7. Temporal component 608 can identify time data 610 that represents a run time during the presentation of the video 606 characterized by the related content 604 being relevant. For instance, drawing from the previous example, if video 606 mentions a particular brand of chocolate at a particular time during the presentation of video 606, then at that time, related content 604 that relates to the making of chocolate items can be deemed to be relevant. However, after some time has elapsed and there are not more mentions of chocolate in video 606, the above-mentioned related content might no longer be relevant. Accordingly, the time range of relevance for a particular item of related content 604 can be included in time data 610.

Tagging component 612 can be configured to tag video 606 with tag data 614 that includes an instruction to trigger display of a reference to related content 604 at the run time of a presentation of video 606 that is included in time data 610. It is appreciated that the instruction to trigger display of the reference can be for a display in a different portion of the screen than the area in which video 606 is being presented.

Figure 7:
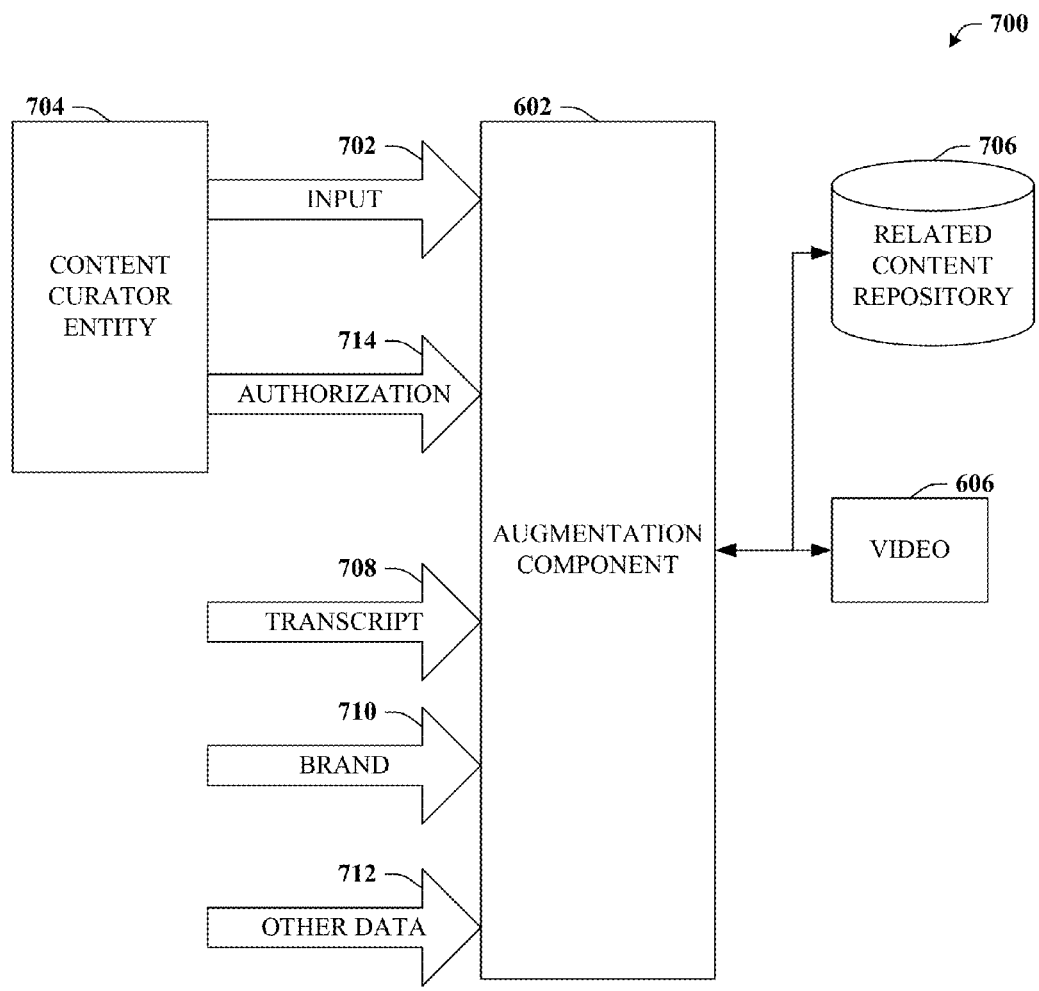
FIG. 7 illustrates a block diagram of a system that can provide for additional features or aspects in connection with the augmentation component in accordance with certain embodiments of this disclosure.

Turning now to FIG. 7, system 700 is provided. System 700 provides for additional features or aspects in connection with augmentation component 602. As detailed previously, augmentation component 602 can identify related content 604. In some embodiments, augmentation component 602 can identify related content 604 based on input 702 received from a content curator entity 704, which can be a device associated with an individual creating or curating video 606. In such embodiments, the curator the other content that is related, and augmentation component 602 identifies related content 604 based on that input 702.

Additionally or alternatively, in some embodiments, augmentation component 602 can identify related content 604 without explicit direction from the content creator. For example, augmentation component 602 can examine video 606, perform various types of analyses, and compare video 606 to a set of related content items included in related content repository 706.

For instance, some embodiments, augmentation component 602 can identify based on a transcript 708 of the presentation of video 606. Transcript 708 can be a rich source of information about video 606 as well as information that can be accurately and efficiently mapped to items of related content with a high degree of confidence. In some embodiments, augmentation component 602 can be identified based on a brand 710. Brand 710 can related to a product brand, a channel brand, a video content brand, web content brand, etc. Brand 710 can also serve as a rich source of information that can be effectively mapped to items of related content. For example, if video 606 relates to a particular brand of automobile, then rich sources of information can be mined and presented as related content that relate to that particular automobile (e.g., specifications, images, etc.) or to the manufacturer and so forth. It is appreciated that augmentation component 602 can identify related content in many other ways, based on various other examples of data, which is illustrated as other data 712.

In some embodiments, and particularly when related content is identified based on machine techniques (e.g., without curator input or the like), then such related content might require authorization 714 from content curator entity 704.

Example Methods for Presentation of Amplified Content

Figure 8:
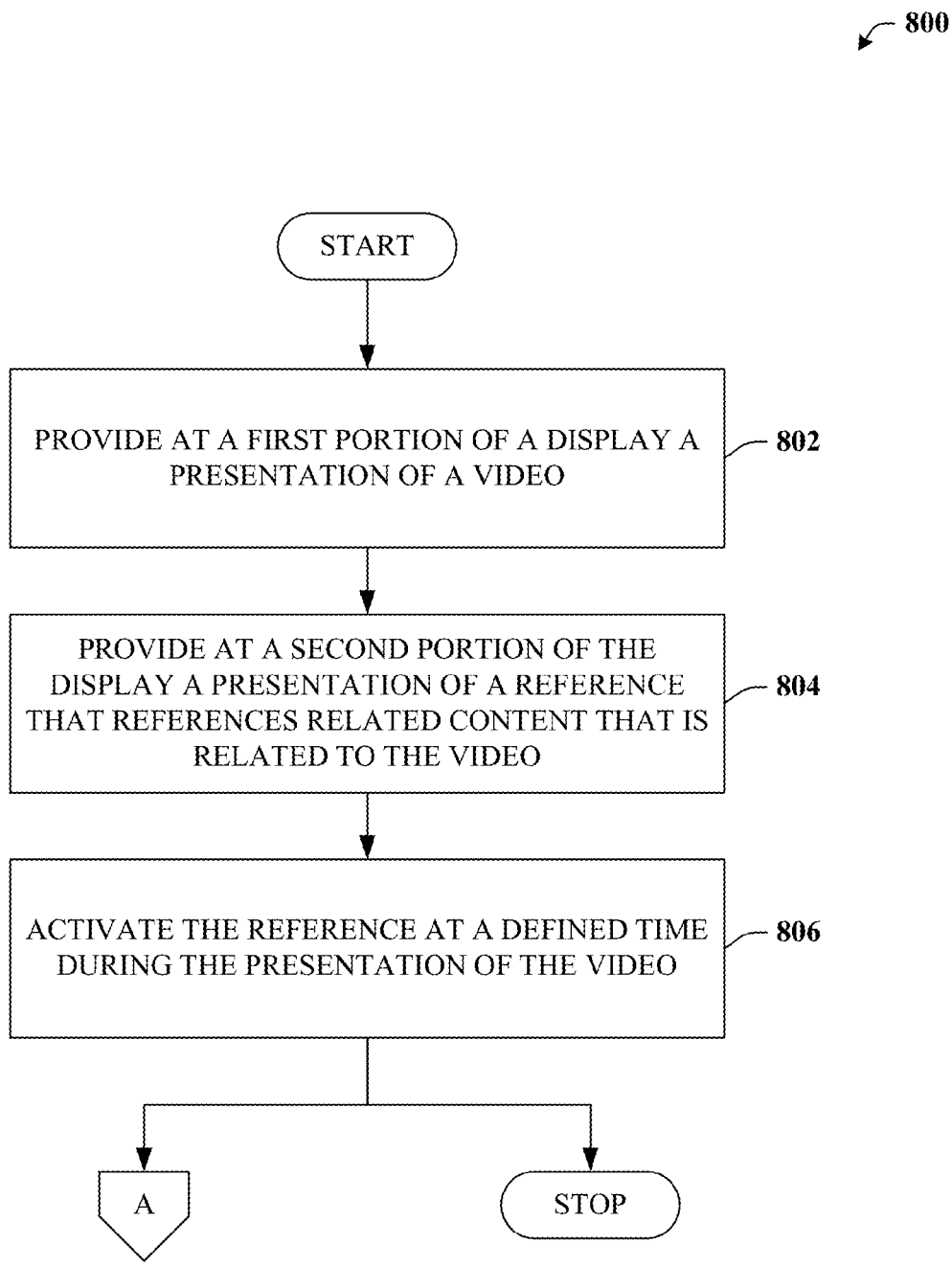
FIG. 8 illustrates an example methodology that can provide for presenting amplified content in accordance with certain embodiments of this disclosure.
Figure 9:
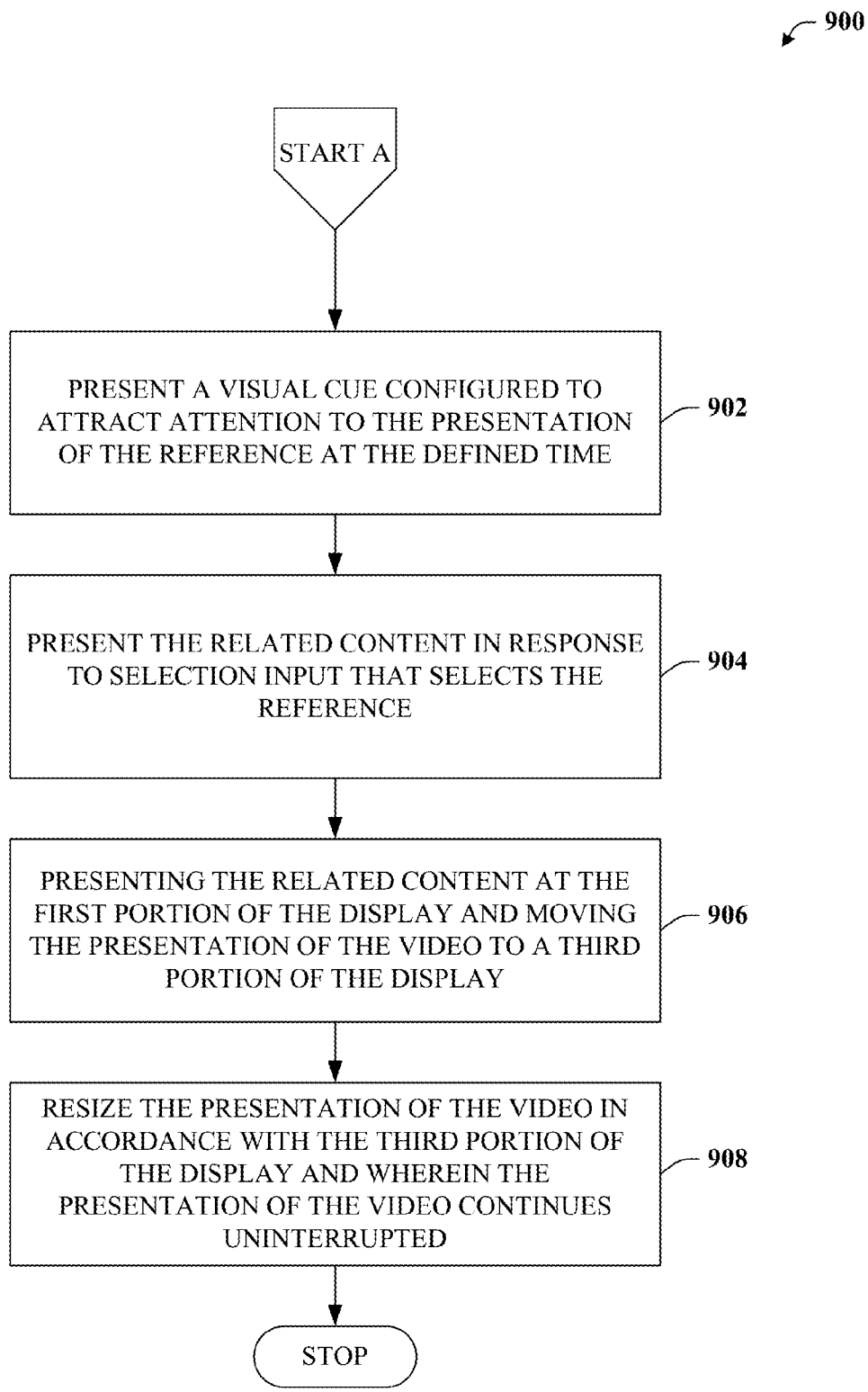
FIG. 9 illustrates an example methodology that can provide for additional features or aspects in connection with presenting amplified content in accordance with certain embodiments of this disclosure.

FIGS. 8 and 9 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 8 illustrates exemplary method 800. Method 800 can provide for presenting amplified content. For example, at reference numeral 802, a presentation of a video can be provided at a first portion of a display. For instance, the display can be or can include a web browser and the presentation of the video can be provided by an embedded player situated at the first portion.

At reference numeral 804, a presentation of a reference that references related content that is related to the video can be provided at a second portion of the display. This reference (or multiple references) can be presented, e.g., in a frame close to the embedded player.

At reference numeral 806, the reference can be activated at a defined time during the presentation of the video. For example, certain references might become relevant at certain times during the progress of the video. At such a time, the reference can be activated, which can mean the link to the related content becomes active, the reference is highlighted or otherwise updated with visual indicia intended to draw attention, or the reference becomes visible in second portion or is initially presented. Method 800 can end or continue to insert A, which is detailed in connection with FIG. 9.

FIG. 9 illustrates exemplary method 900. Method 900 can provide for additional features or aspects in connection with presenting amplified content. For example, at reference numeral 902, a visual cue can be presented that is configured to attract attention to the presentation of the reference detailed in connection with reference numeral 804 of FIG. 8, or in some cases reference numeral 806. The visual cue can be presented at the defined time that is detailed in connection with reference numeral 806. For example, at the defined time the reference element might flash or be highlighted or the like, and the defined time can occur at a point during the video presentation in which the related content (linked to by the reference) is relevant.

At reference numeral 904, the related content can be presented in response to selection input that selects the reference. In other words, a content consumer viewing the presentation of the video, and noticing the reference (e.g., at the defined time due to a visual cue), might click the reference icon, which can prompt a presentation of the related content in addition to the video. The related content can be presented alongside the video in different portions of the display and/or an associated user interface.

At reference numeral 906, the related content can be presented at the first portion of the display. As detailed in connection with reference numeral 802 of FIG. 8, the presentation of the video typically initially occupies the first portion of the display. Thus, if related content is presented in the first portion of the display, then the presentation of the video can be moved to a third portion of the display. At reference numeral 908, the presentation of the video can be resized in accordance with the third portion of the display. It is appreciated that while the presentation of the video is moved and/or resized, that presentation of the video can continue uninterrupted, and the viewing experience need not be halted while the content consumer examines the related content. In some embodiments, the presentation of the video might alternatively be paused, either temporarily or until manually unpaused by the content consumer.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 10:
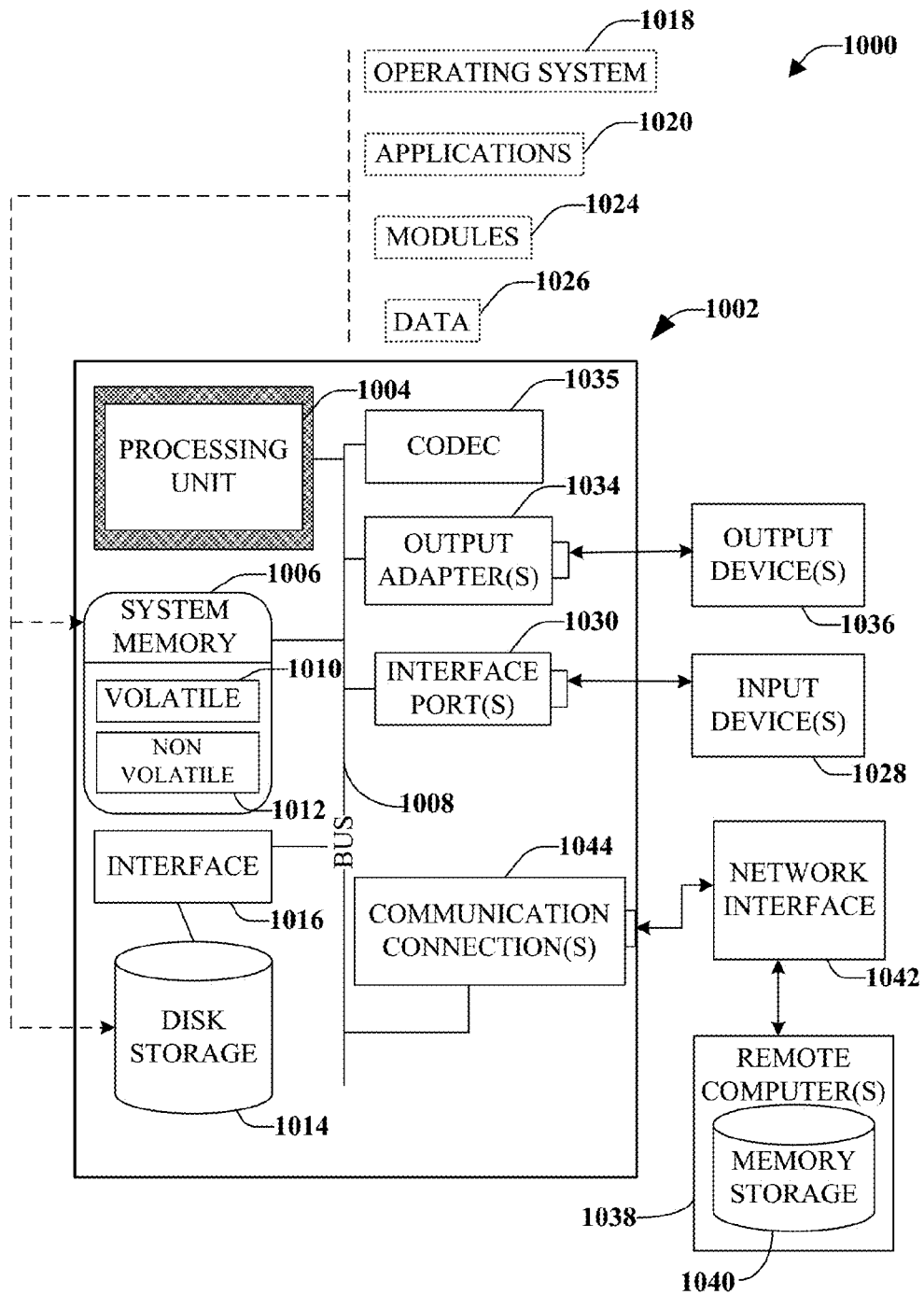
FIG. 10 illustrates an example schematic block diagram for a computing environment in accordance with certain embodiments of this disclosure.

With reference to FIG. 10, a suitable environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI) or others now in existence or later developed.

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1035 may include at least one of an encoder or decoder, wherein the at least one of an encoder or decoder may consist of hardware, software, or a combination of hardware and software. Although, codec 1035 is depicted as a separate component, codec 1035 may be contained within non-volatile memory 1012 or included in other components detailed herein. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), resistive RAM (RRAM), or others now in existence or later developed.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 and/or transmitted to the server or application. The user can be provided the opportunity to authorize having such information collected and/or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
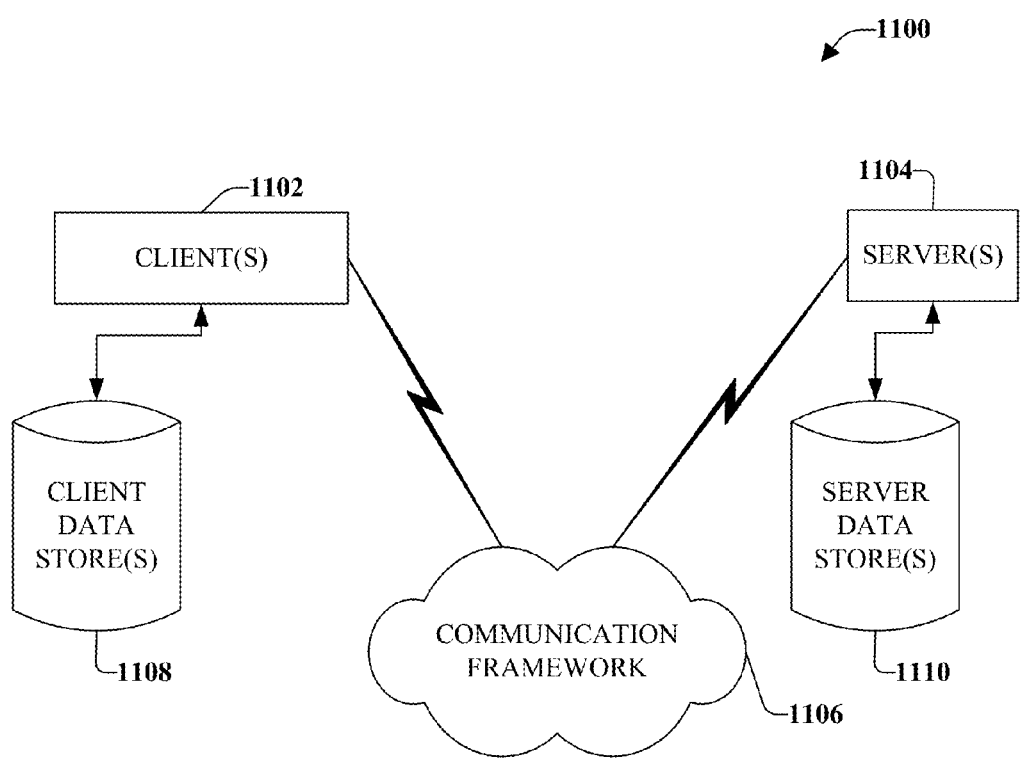
FIG. 11 illustrates an example block diagram of a computer operable to execute certain embodiments of this disclosure.

Referring now to FIG. 11, there is illustrated a schematic block diagram of a computing environment 1100 in accordance with this specification. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a cookie and/or associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A content presentation system, comprising:
a memory that stores computer executable components; and
a microprocessor that executes the following computer executable components stored in the memory:
a presentation component that provides a presentation of a video at a first portion of a display;
an augmentation component that identifies related content that is related to the presentation of the video based on a tag inputted by a content curator that corresponds to a feature of the video, wherein the related content is selected from among a set of received search engine results including different content types associated with the tag, the related content including at least an interactive map of a location in response to the augmentation component identifying a map content type as being included amongst the different content types;
    a temporal component that identifies a respective defined time during the presentation of the video that the related content is relevant to the video, wherein the related content includes at least the interactive map of the location;
    an amplification component that facilitates;
        at a second portion of the display a presentation of a set of deactivated reference icons that each reference and provide an indication of one of the different content types of related content that is related to the video, wherein the set of reference icons includes at least a map content type icon; and
        at a third portion of the display a presentation of the selected related content including at least the interactive map of the location in response to a user selecting the map content type icon; and
    a timing component that instructs the amplification component to activate a subset of the deactivated reference icons that correspond to the selected related content at the respective defined time, wherein the activated subset of reference icons includes at least the map content type icon.

2. The system of claim 1, wherein the related content further includes at least one of: another video, a second map of a location associated with the video, a street view of the location, content from a knowledge repository, content from a charting mechanism, data associated with a user account, or an application.

3. The system of claim 1, wherein the amplification component facilitates at the defined time a visual cue configured to attract attention to the presentation of the subset of activated reference icons.

4. The system of claim 1, wherein the related content is presented in the first portion of the display and the presentation of the video is moved to a third portion of the display.

5. The system of claim 4, wherein the presentation of the video is resized while being moved to the third portion.

6. The system of claim 1, wherein the presentation of the video continues uninterrupted during presentation of the related content.

7. A content augmentation system, comprising:
    a memory that stores computer executable components; and
    a microprocessor that executes the following computer executable components stored in the memory:
        an augmentation component that identifies related content that is related to a presentation of a video based on a tag inputted by a content curator that corresponds to a feature of the video, wherein the related content is selected from among a set of received search engine results including different content types associated with the tag, the related content including at least an interactive map of a location in response to the augmentation component identifying a map content type as being included amongst the different content types;
        a temporal component that identifies time data that represents a run time during the presentation characterized by the related content being relevant to the feature of the video; and
        a tagging component that tags the video with tag data that includes an instruction to trigger display of a reference icon to the related content at the run time.

8. The system of claim 7, wherein the augmentation component identifies the related content based on a comparison of the video to a set of related content items included in a related content repository.

9. The system of claim 8, wherein the related content is identified by the augmentation component based on a transcript of the presentation of the video.

10. The system of claim 8, wherein the related content is identified by the augmentation component based on a brand for at least one of a product, a channel, video content, or other web content.

11. The system of claim 8, wherein the augmentation component receives authorization from a content curator entity for the related content identified by the amplification component.

12. A method, comprising:
    employing a computer-based processor to execute computer executable components stored in a memory to perform the following:
        providing at a first portion of a display a presentation of a video;
        identifying related content that is related to the presentation of the video based on a tag inputted by a content curator that corresponds to a feature of the video, wherein the related content is selected from among a set of received search engine results including different content types associated with the tag, the related content including at least an interactive map of a location in response to the augmentation component identifying a map content type as being included amongst the different content types;
        identifying a respective defined time during the presentation of the video that the interactive map of the location is relevant to the video;
        providing at a second portion of the display a presentation of a set of deactivated reference icons that each reference and provide an indication of one of the different content types of related content that is related to the video, wherein the set of reference icons include at least a map content type icon; and
        providing at a third portion of the display a presentation of the selected related content in response to a user selecting one of the reference icons, wherein the related content includes at least the interactive map of the location; and
        activating a subset of the deactivated reference icons that correspond to the selected related content at the respective defined time, wherein the activated subset of reference icons include at least the map content type icon.

13. The method of claim 12, further comprising presenting a visual cue configured to attract attention to the presentation of the subset of activated reference icons at the defined time.

14. The method of claim 12, wherein the providing at the third portion of the display the selected related content includes presenting the related content at the first portion of the display and moving the presentation of the video to a third portion of the display.

15. The method of claim 14 further comprising resizing the presentation of the video in accordance with the third portion of the display and wherein the presentation of the video continues uninterrupted.

16. The system of claim 1, wherein the temporal component identifies the defined time during the presentation of the video that the interactive map of the location is relevant to the video based on analyzing a transcript of the presentation video.

17. The system of claim 1, wherein the related content further includes information from a wiki data source in response to the augmentation component identifying a knowledge repository content type as being included amongst the different content types, and wherein the set of reference icons further includes a knowledge repository content type icon, and wherein the activated subset of reference icons further includes the knowledge repository content type icon.

18. The system of claim 1, wherein the interactive map includes at least one of a street view of the location, a satellite map of the location, and an orthogonal map of the location.

* * * * *